May 6, 1969         J. MORKOSKI         3,442,336
FLEXIBLE MOUNTING FOR DISK HARROW GANG
Filed July 21, 1966         Sheet 1 of 2
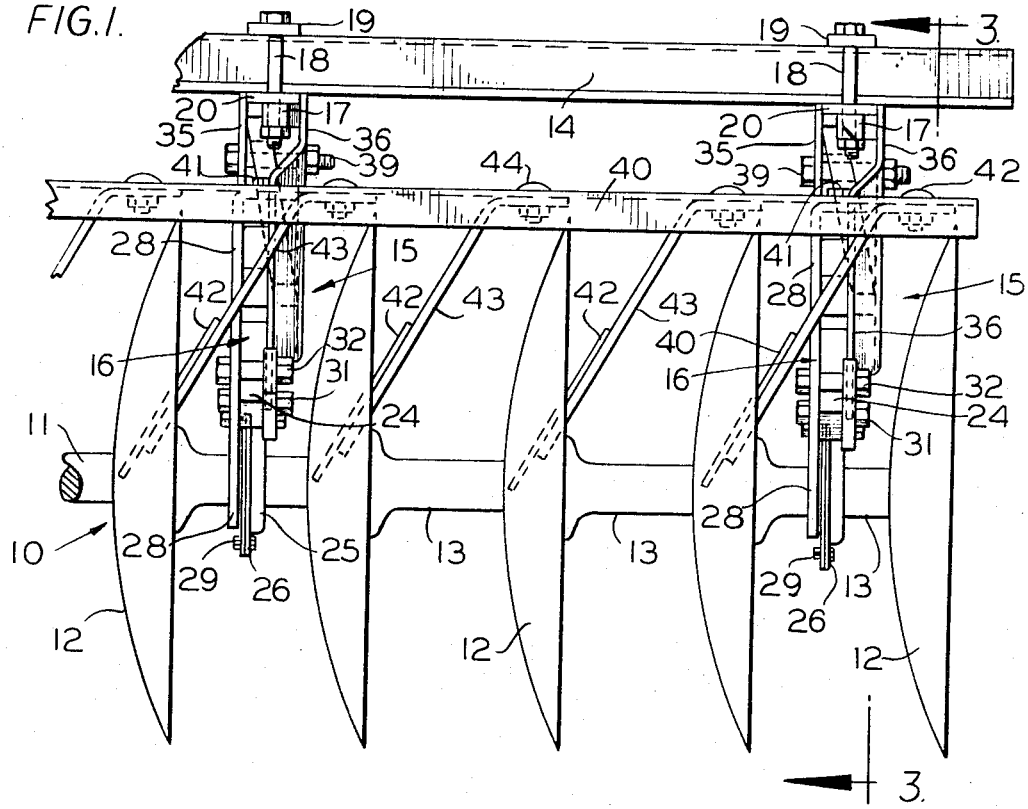
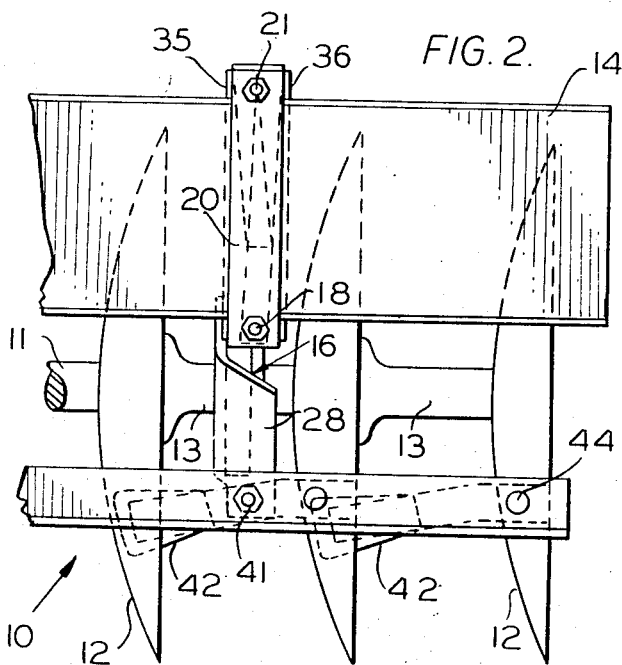
INVENTOR
JAMES MORKOSKI
ATT'Y May 6, 1969  J. MORKOSKI  3,442,336
FLEXIBLE MOUNTING FOR DISK HARROW GANG
Filed July 21, 1966  Sheet 2 of 2
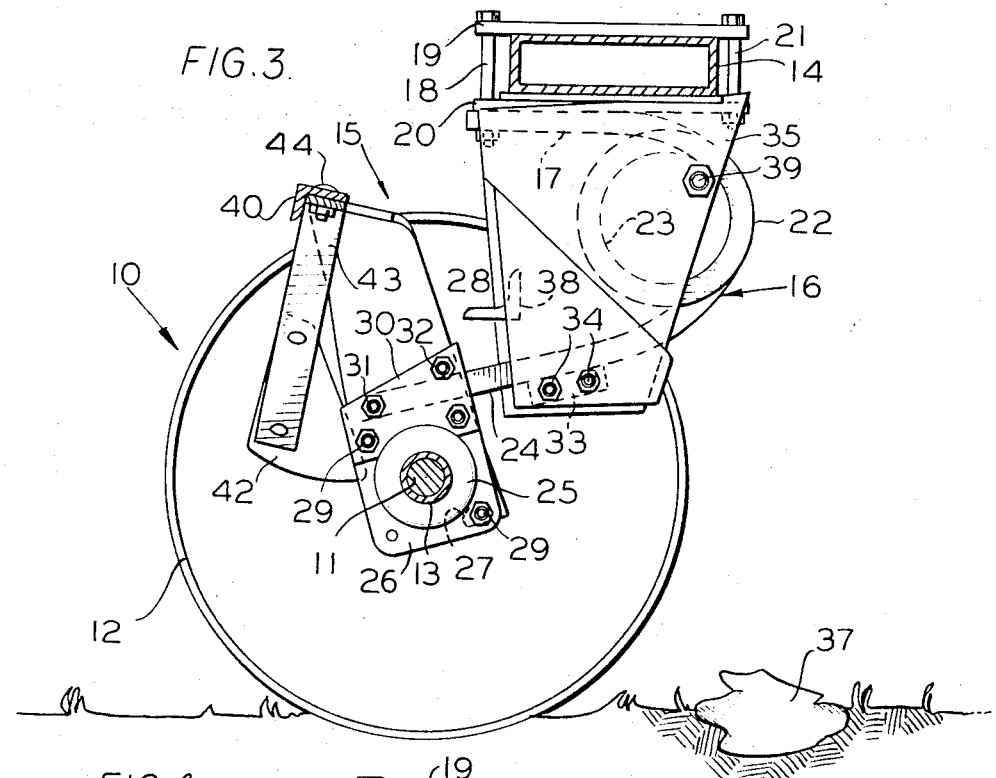
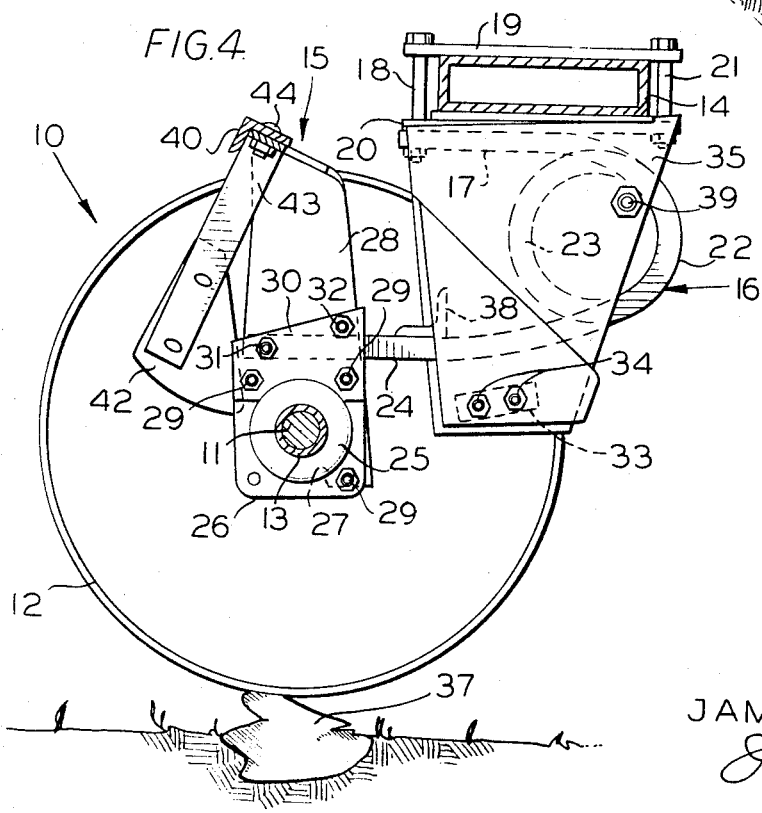
INVENTOR
JAMES MORKOSKI
ATT'Y

United States Patent Office 3,442,336
Patented May 6, 1969

3,442,336
FLEXIBLE MOUNTING FOR DISK HARROW GANG
James Morkoski, Clarendon Hills, Ill., assignor to International Harvester Company, Chicago, Ill., a corporation of Delaware
Filed July 21, 1966, Ser. No. 566,974
Int. Cl. A01b 21/08, 23/00
U.S. Cl. 172—572    5 Claims

ABSTRACT OF THE DISCLOSURE

An agricultural implement of the disk harrow type having a plurality of disks mounted on a carrier which is flexibly suspended from a supporting frame by means of a spring steel member, helically bent to form a coil, being positioned and retained in such a manner as to confine the bending of the spring member substantially to the bight portion of the coil, and scrapers mounted on said carrier so as to remain in scraping relationship with the disks during operation of the implement.

---

This invention relates to earth working implements and particularly to disk harrows. More specifically, the invention concerns a novel means for supporting a disk harrow gang.

In a conventional disk harrow a plurality of disks are rotatably mounted coaxially on an elongated arbor bolt, and spacing between the disks is maintained by spools carried in spaced bearings and suspended by hangers from a supporting frame, and when an obstacle is encountered by one of the disks substantially the entire gang rises, imposing its weight on the affected disk, frequently resulting in damage thereto. Efforts to overcome this problem by imparting flexibility to the disks has resulted in inferior ground penetration, and the principal object of this invention is the provision of novel mounting means for a disk harrow normally holding the disks to their work and accommodating yielding of the gang only when an obstruction is encountered tending to raise the gang, whereby damage to the disks is prevented.

Other objects and advantages of the invention will become clear from the following detailed description when read in conjunction with the accompanying drawings, wherein:

FIGURE 1 is a view in rear elevation of a portion of a disk harrow gang incorporating the features of this invention;

FIGURE 2 is a plan view of a portion of the structure shown in FIGURE 1;

FIGURE 3 is a section taken on the line 3—3 of FIGURE 1 showing the normal working position of the harrow gang; and, FIGURE 4 is a view similar to FIGURE 3 showing the effect on the gang of encountering an obstruction.

It may be understood that the present invention is applicable to disk harrows and the like utilizing a conventional supporting frame carrying one or more gangs of disks, such a gang being indicated in part in the drawings and designated by the numeral 10. The gang 10 comprises a carrier in the form of an elongated bolt 11 upon which a plurality of earth working disks 12 are mounted and maintained in fixed axially spaced relation by spacer spools 13. The gang 10 is suspended from a frame member in the form of a beam 14 of rectangular cross-section, by hanger means 15 including an elongated bar 16 of spring steel having its upper generally horizontal portion 17 secured at its rear end by a bolt 18 to upper and lower plates 19 and 20 forming, with another bolt 21, clamping means by which the disk gang is secured to beam 14.

The forward bight portion 22 of spring bar 17 is bent to form a coil 23 and a downwardly and rearwardly extending portion 24 terminating rearwardly of beam 14.

The disk gang 10 is rotatably supported by two or more hangers 15, and a description of one suffices for all. A spacer 13 is rotatably received in a bearing 25 having a radial flange 26, the bearing 25 being seated in a socket 27 at the lower end of an upright bracket 28 and secured thereto by two or more bolts 29.

Likewise affixed to flange 26 by bolts 29 is a plate 30 therebetween and bracket 28 the rear end 24 of spring bar 16, the rear end of the spring bar being anchored by a bolt 31 passing through registering openings in plate 30, bar portion 24 and bracket 28. Another bolt 32 secures plate 30 to bracket 28 and engages the upper surface of the rear portion of spring bar 24.

As viewed in FIGURE 3, spring bar 16 is pretensioned to exert downward pressure on the disks 12 to keep them in the ground, and downward movement of the disks is limited by the provision of a stop bar 33 secured by bolts 34 between the lower end of a pair of laterally spaced plates 35 and 36 affixed at their upper ends to and depending from plate 20. Under normal operating conditions spring bar 16 is prestressed to hold the disk gang to its work and to maintain the bar in engagement wiht stop 33. However, upon encountering an obstruction such as a rock indicated at 37 in FIGURES 3 and 4, instead of the entire disk gang, along with beam 14 and the remainder of the harrow frame, resting its weight upon the disk engaging the rock, the gang is capable of independent flexibility to allow the affected disk to yield upwardly as shown in FIGURE 4, relative to the harrow frame.

Upward movement of the disk gang is limited by the provision of an angle bar stop 38 secured between the plates 35 and 36 and engageable with the upper edge of spring bar 16.

The spring bar 16 is positioned by the provision of a bolt 39 engaging the inner edge of bight portion 22, and the plates 35 and 36 serve to laterally retain the spring rod 16 and prevent deflection thereof. Also, the upper ends of the plates are spaced sufficiently to span the double thickness of the spring rod forming coil 23, plate 35 having its lower portion offset inwardly to provide a spacing between the plates sufficient only to span the thickness of the tail end of the hanger bar.

Forming a part of the disk gang unit 10 and vertically movable therewith when the disks encounter an obstruction is a scraper carrying bar 40 secured by bolt 41 to the laterally bent upper end of bracket 28. A scraper is provided for each of the disks 12 and comprises a blade 42 disposed adjacent to the inner face of the disk and mounted on an arm 43, the upper end of which is connected to bar 40 by bolt 44.

It is believed that the novel disk harrow construction of this invention will be clearly understood from the foregoing description. It should likewise be understood that the invention has been described in its preferred embodiment and that modifications may be made therein without departing from the spirit of the invention or the scope of the appended claims.

What is claimed is:

1. In a disking implement including a traveling supporting frame, a disk carrier and a plurality of disks mounted coaxially on said carrier, a hanger suspending the disk carrier from the supporting frame comprising, a spring steel member having an upper portion secured to the supporting frame and a forward bight portion helically bent to form a coil and having its lower end downwardly biased and extending generally horizontally rearwardly and downwardly with respect to the direction of travel, means mounting the disk carrier on the rear end of said hanger for movement upwardly against the bias thereof, positioning means carried by the supporting frame and disposed within said coil and engageable with the inner edge of the bight portion thereby confining the bending of said spring steel member to substantially within said bight portion, and stop means carried by the supporting frame engageable with the lower portion of said hanger to limit the downward movement of the disks.

2. The invention set forth in claim 1, wherein plate-like members affixed to and suspended from the supporting frame are disposed on opposite sides of and confine said spring steel member to prevent lateral deflection thereof.

3. The invention set forth in claim 2, wherein said stop means is carried by one of said plate-like members.

4. The invention set forth in claim 3, wherein second stop means is carried by said plate-like members and engageable with the upper portion of said hanger member to limit upward movement of the disks.

5. The invention set forth in claim 1, wherein a transverse bar is mounted on said carrier for vertical movement therewith relative to the supporting frame, and a plurality of disk scrapers are mounted on said bar and extend therefrom into scraping relation with the respective one of said disks.

References Cited

UNITED STATES PATENTS

| | | | |
|---|---|---|---|
| 907,505 | 12/1908 | Kaufmann et al. | 172—708 |
| 2,266,819 | 12/1941 | Seaholm | 172—572 X |
| 2,320,742 | 6/1943 | Newkirk | 172—596 X |
| 2,750,861 | 6/1956 | Erwin | 172—573 |
| 3,098,531 | 7/1963 | Hunter | 172—710 |

ANTONIO F. GUIDA, *Primary Examiner.*

WALTER J. CONLON, *Assistant Examiner.*